No. 786,600.

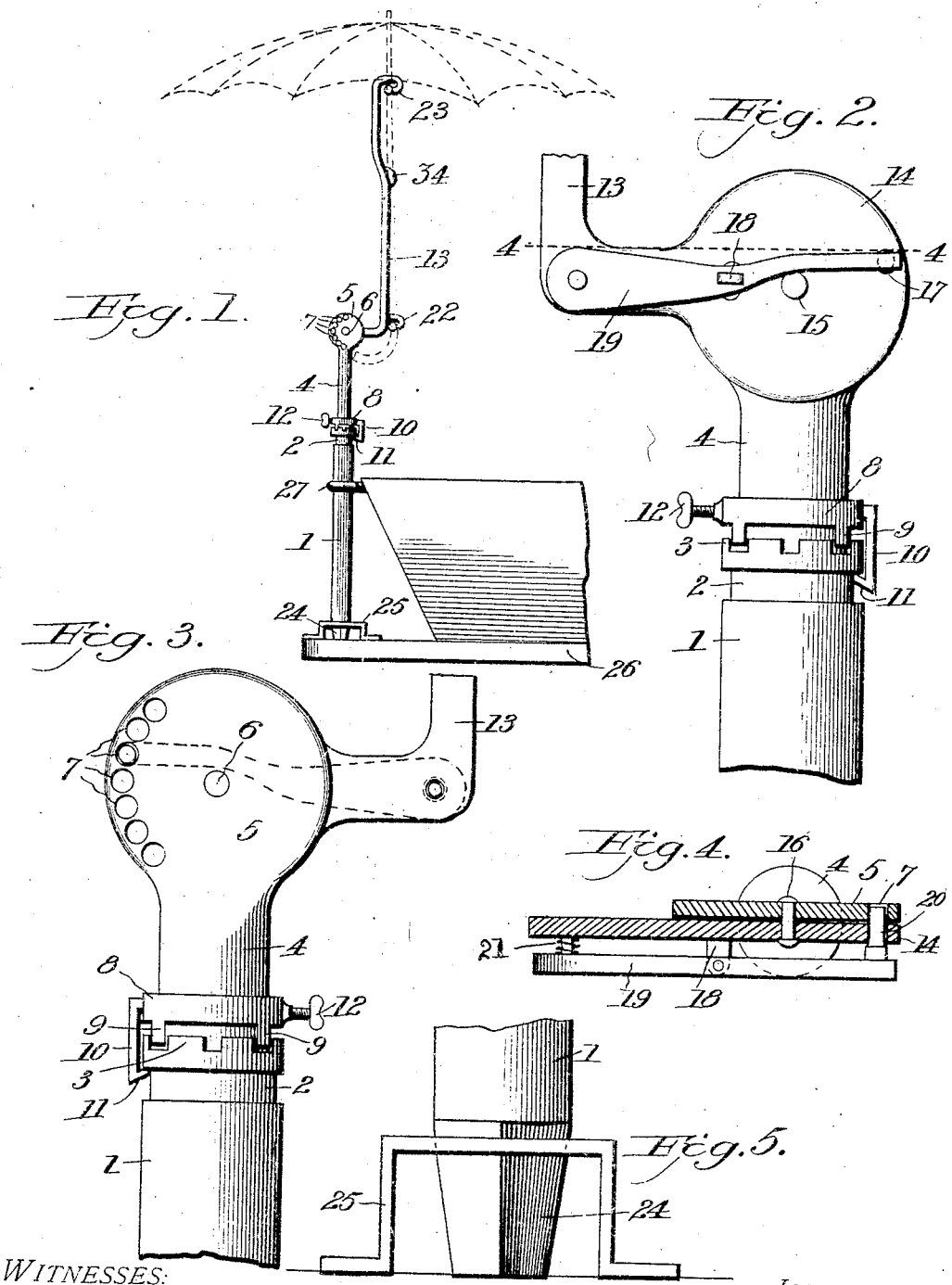

Patented April 4, 1905.

UNITED STATES PATENT OFFICE.

HICKMAN ROWLETT, OF JACKSON, TENNESSEE.

UMBRELLA-SUPPORT.

SPECIFICATION forming part of Letters Patent No. 786,600, dated April 4, 1905.

Application filed September 23, 1904. Serial No. 225,714.

*To all whom it may concern:*

Be it known that I, HICKMAN ROWLETT, a citizen of the United States, residing at Jackson, in the county of Madison and State of Tennessee, have invented new and useful Improvements in Umbrella-Supports, of which the following is a specification.

My invention relates to umbrella-supports, and especially to that class of supports adapted to be secured to and used in connection with a vehicle.

The object of my invention is to provide an umbrella-support which may be easily and quickly secured to the vehicle and readily and conveniently removed therefrom.

A further object of my invention is to provide an umbrella-support conveniently adjustable vertically and angularly.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a view in side elevation of my improved umbrella-support, showing an umbrella in outline secured therein. Fig. 2 is a view in side elevation, showing in detail the lower end of the umbrella-retaining rod with the bearing-disk and pawl-lever. Fig. 3 is a view in side elevation of the upper end of the upright rod, showing in detail the disk formed thereon used as a bearing in connection with the disk shown in Fig. 2. Fig. 4 is a transverse sectional view taken on line 4 4 of Fig. 2. Fig. 5 is a detail view of the lower end of the upright and the yoke for connection with the vehicle.

Like characters of reference designate corresponding parts throughout the several views.

In its preferred form my improved umbrella-support comprises a tubular upright 1, provided near its upper end with a peripheral groove 2. About the upper edge of tubular upright 1 and above grooves 2 I form a plurality of teeth 3. Within the tubular upright 1 I slidably dispose a rod 4, adapted to telescope with and into tubular upright 1. The upper end of rod 4 is provided with a bearing-disk 5, which is provided with a centrally-disposed hole 6 and a series of holes 7, coincident with a circle adjacent to the edge of disk 5. A collar 8, provided with teeth 9, is disposed about rod 4 and the teeth 9, adapted to engage with the teeth 3 of the tubular upright 1. The collar 8 is also provided with a clip 10, with a hooked portion 11 at its lower end adapted to engage groove 2 of tubular upright 1. The collar 8 is also provided with a thumb-screw 12, adapted to bear against and secure upright rod 4 at any predetermined height relative to tubular upright 1. An umbrella-retaining rod 13 is provided at its lower end with a bearing-disk 14, provided with a centrally-disposed hole 15 and adapted to be pivotally secured to the disk 5 by means of pivot-pin 16. The disk 14 is also provided with a hole 17 adjacent to one edge and disposed to register with the hole 7 of disk 5. A lug 18 is secured to or formed integral with the disk 14, upon which is pivoted a lever 19, provided at one end with a pawl 20, disposed within the hole 17 of the disk 14 and adapted to enter and engage any one of the holes 7 in the disk 5. A spring 21 is provided at the opposite end of the lever 19, adapted to force the pin 20 into one of holes 7. The said umbrella-retaining rod 13 is provided near its lower end with a hook 22, adapted to encircle and retain the rod of an umbrella. The upper end of rod 13 is formed into a hook 23, similar to hook 22, and a plate 24 is secured to said rod 13 intermediate of the ends. The lower end of tubular upright 1 is tapered and squared, as at 24, adapted to fit within an opening of similar conformation formed in the yoke 25, which may be secured to the flooring 26 of a vehicle. The tubular upright 1 may further be secured to the vehicle, as by clamp 27, secured to the seat or other convenient portion of the vehicle.

It is evident that my improved umbrella-support may be secured to and used in connection with any vehicle and attached thereto in any convenient manner. As shown in the drawings, the upright is secured by means of the yoke 25 and the clamp 28, and when so used the operation is as follows: With the tubular upright secured in any convenient manner and the collar 8 placed above the end of said upright, with the clip 10 holding in groove 2 and the teeth 9 registering with the teeth 3, the rod 4 may be slidably passed through collar 8 and into the tubular upright 1. The rod 4 may be secured at any desired height by means of the thumb-screw 12, bearing against and engaging the said rod 4. An umbrella may now be placed with the lower end of its rod within hook 22 and the central portion bearing against plate 34. The umbrella-retaining rod 13 may now be sprung, so that the hooked portion 23 may be passed over and about the umbrella-rod adjacent to the stretchers and by reason of the spring of the rod 13 held securely within the hooks 22 and 23. By pressing the lever 19 against the tension of spring 21 the pawl 20 is withdrawn from the holes 7, which permits an angular adjustment of the umbrella, and when the desired angular adjustment is obtained the release of lever 19 will cause the pawl 20 to enter one of holes 7 then registering with hole 17 to retain the umbrella at such a desired adjustment.

While I have shown a method as by use of the yoke 25 and clamp 27 of securing my umbrella-support to a vehicle, it is evident that it may be secured in any other approved manner. It is further obvious that other means than the lever 19 and pawl 20 might be substituted to retain the umbrella at a desired angular adjustment.

While the use of the collar 8 and the set-screw 12, as shown, possesses obvious advantages, it is evident that other means of retaining the rod 4 at a desired vertical adjustment may be substituted therefor and that other changes of a minor nature may be made without departing from the spirit of my invention or the scope of the claims.

Having thus described my invention, what I claim, and desire to secure by Letters Patent, is—

1. In a device of the character described, a tubular upright having a peripheral groove formed adjacent to the upper end and teeth arranged in a circumferential series above the groove, an upright rod slidably disposed within the tubular upright, a collar embracing the upright rod and provided with teeth adapted to engage the teeth upon the upper end of the tubular upright, a clip secured to the collar and engaging the peripheral groove, means adapted for rigidly securing the upright rod in a predetermined position relative to the collar and means for securing an umbrella upon the upright rod.

2. In a device of the character described, a vertically-adjustable supporting-rod, a disk formed upon the upper end thereof, and provided with a centrally-disposed hole and with a series of holes arranged coincident with a circle and adjacent to the outer edge of the disk, an umbrella-retaining rod, a disk formed upon the lower end of the retaining-rod and provided with a centrally-disposed hole and with a hole adjacent to the edge, a pin passing through the centrally-disposed holes of both disks and adapted to permit the rotary movement of the disks relative to each other, a spring-pressed pawl passing through the hole in the disk formed on the retaining-rod and adapted to enter any one of the holes in the edge of the disk formed on the upright.

3. In a device of the character described, a vertically-adjustable supporting-rod provided with a hinge member at its upper end and an umbrella-retaining rod provided at its lower end with a hinge member adapted to coöperate with the hinge member upon the supporting-rod to form a hinge and also provided with two hooks adapted to engage the rod of an umbrella and a plate adapted to bear against the umbrella-rod, said retaining-rod being capable of being so sprung that the hooks will pass over and around the umbrella-rod.

4. A device of the character described comprising a vertically-adjustable supporting-rod provided with a disk at its upper end, said disk being provided with a centrally-disposed hole and with a series of holes coincident with a circle adjacent to the periphery of the disk, an umbrella-retaining rod provided at its lower end with a disk, said disk being provided with a centrally-disposed hole and a hole adjacent to the edge, a pin passing through the centrally-disposed holes of the disks and securing them together but permitting a rotary movement of the disks relative to each other, a spring-pressed pawl passing through the hole adjacent to the periphery of the disk formed on the retaining-rod and adapted to enter either of the holes arranged in series adjacent to the periphery of the upright disk, a hook near the lower end of the retaining-rod adapted to engage an umbrella-rod, a plate intermediate of the ends and the upper end curved to embrace an umbrella-rod and all so disposed that with the lower hook engaging and the plate bearing against an umbrella-rod, the upper end of the retaining-rod may be so sprung that the upper hook will also engage the umbrella-rod.

In testimony whereof I affix my signature in presence of two subscribing witnesses.

HICKMAN ROWLETT.

Witnesses:
R. W. WARMALTO,
F. PARKER.